(12) United States Patent
Udagawa et al.

(10) Patent No.: US 10,948,046 B2
(45) Date of Patent: Mar. 16, 2021

(54) CVT RING MEMBER AND METHOD FOR MANUFACTURING THE SAME

(71) Applicants: Aichi Steel Corporation, Tokai (JP); Toyota Jidosha Kabushiki Kaisha, Toyota (JP)

(72) Inventors: Takeshi Udagawa, Aichi (JP); Yukio Ito, Aichi (JP); Koji Nishida, Aichi (JP)

(73) Assignees: Aichi Steel Corporation, Tokai (JP); Toyota Jidosha Kabushiki Kaisha, Toyota (JP)

( * ) Notice: Subject to any disclaimer, the term of this patent is extended or adjusted under 35 U.S.C. 154(b) by 451 days.

(21) Appl. No.: 15/103,526

(22) PCT Filed: Dec. 9, 2014

(86) PCT No.: PCT/JP2014/082535
§ 371 (c)(1),
(2) Date: Jun. 10, 2016

(87) PCT Pub. No.: WO2015/087869
PCT Pub. Date: Jun. 18, 2015

(65) Prior Publication Data
US 2016/0312854 A1  Oct. 27, 2016

(30) Foreign Application Priority Data

Dec. 12, 2013 (JP) .............................. JP2013-256574

(51) Int. Cl.
*C22C 38/22* (2006.01)
*C22C 38/24* (2006.01)
(Continued)

(52) U.S. Cl.
CPC .................. *F16G 5/16* (2013.01); *B21B 5/00* (2013.01); *C21D 1/06* (2013.01); *C21D 1/18* (2013.01);
(Continued)

(58) Field of Classification Search
CPC ........... C23C 8/26; C22C 38/22; C22C 38/24; C22C 38/02; C22C 38/04; C22C 38/12;
(Continued)

(56) References Cited

U.S. PATENT DOCUMENTS 6,017,641 A * 1/2000 Aoki ........................ C21D 1/18
148/208
6,607,693 B1 * 8/2003 Saito ....................... C22C 1/045
148/421
(Continued)

FOREIGN PATENT DOCUMENTS

EP  1 900 838 A1  3/2008
JP  62177152 A * 8/1987
(Continued)

OTHER PUBLICATIONS

R. E. Napolitano, Measurement of ASTM Grain Size Number, 6 pages, date not known.*
(Continued)

*Primary Examiner* — Vanessa T. Luk
(74) *Attorney, Agent, or Firm* — Oblon, McClelland, Maier & Neustadt, L.L.P.

(57) ABSTRACT

Provided is a CVT ring member having a nitrided layer on a surface thereof. The CVT ring member includes a chemical composition containing, by mass, C: 0.43 to 0.70%, Si: 2.50% or less, Mn: 1.00% or less, Cr: 1.50 to 4.00%, Mo: 0.50 to 3.00% and V: 1.00% or less while satisfying a relation of Formula 1: 159×C(%)+91×Si(%)+68×Cr(%)+ 198×Mo (%)+646≥1,000, and the balance being Fe and
(Continued)

unavoidable impurities. The ring member has a tensile strength of 1,700 MPa or more. The nitrided layer has a surface hardness of HV800 to HV950.

2 Claims, 1 Drawing Sheet

(51) Int. Cl.
| | |
|---|---|
| C21D 9/40 | (2006.01) |
| C21D 1/06 | (2006.01) |
| F16G 5/16 | (2006.01) |
| C23C 8/26 | (2006.01) |
| C22C 38/34 | (2006.01) |
| C22C 38/12 | (2006.01) |
| B21B 5/00 | (2006.01) |
| C21D 1/18 | (2006.01) |
| C22C 38/02 | (2006.01) |
| C22C 38/04 | (2006.01) |
| B21D 53/14 | (2006.01) |

(52) U.S. Cl.
CPC ............... *C21D 9/40* (2013.01); *C22C 38/02* (2013.01); *C22C 38/04* (2013.01); *C22C 38/12* (2013.01); *C22C 38/22* (2013.01); *C22C 38/24* (2013.01); *C22C 38/34* (2013.01); *C23C 8/26* (2013.01); *B21D 53/14* (2013.01)

(58) Field of Classification Search
CPC .. C22C 38/34; C21D 1/02; C21D 1/06; C21D 1/18; C21D 8/0257; C21D 8/0457; C21D 9/40; C21D 1/08; C21D 1/09; C21D 1/10; C21D 1/185; C21D 1/19; C21D 1/20; C21D 1/22; C21D 1/25; C21D 6/002; C21D 6/005; C21D 6/008; C21D 8/005; C21D 8/10; C21D 8/105
See application file for complete search history.

(56) References Cited

U.S. PATENT DOCUMENTS

| | | | |
|---|---|---|---|
| 6,631,542 B1 | 10/2003 | Imai et al. | |
| 2003/0219178 A1* | 11/2003 | Tanaka | C21D 9/36 384/91 |
| 2004/0005103 A1 | 1/2004 | Tanaka et al. | |
| 2008/0017283 A1 | 1/2008 | Maruta et al. | |
| 2012/0018050 A1* | 1/2012 | Kubota | C21D 9/32 148/219 |

FOREIGN PATENT DOCUMENTS

| | | | |
|---|---|---|---|
| JP | 04285142 A | * | 10/1992 |
| JP | 2003105497 A | * | 4/2003 |
| JP | 2003-314567 A | | 11/2003 |
| JP | 2007-154305 A | | 6/2007 |
| JP | 2007-177317 A | | 7/2007 |
| JP | 4285303 B2 | | 6/2009 |
| JP | 2011-195861 A | | 10/2011 |
| JP | 2013-87849 A | | 5/2013 |
| JP | 5425675 B2 | | 2/2014 |
| JP | 5432844 B2 | | 3/2014 |
| WO | WO 2012/083974 A1 | | 6/2012 |

OTHER PUBLICATIONS

Conversion Data, Hardness Conversions for Steels, Mechanical Testing and Evaluation, ASM Handbook, vol. 8, 2003, 12 pages (online printout). (Year: 2003).*
Extended European Search Report dated May 24, 2017 in European Patent Application No. 14869699.0.
International Search Report dated Mar. 10, 2015 in PCT/JP2014/082535, filed Dec. 9, 2014.
Notice of Reasons for Refusal dated Jan. 30, 2018 in Japanese Patent Application No. 2015-552455 (with English language translation).

* cited by examiner

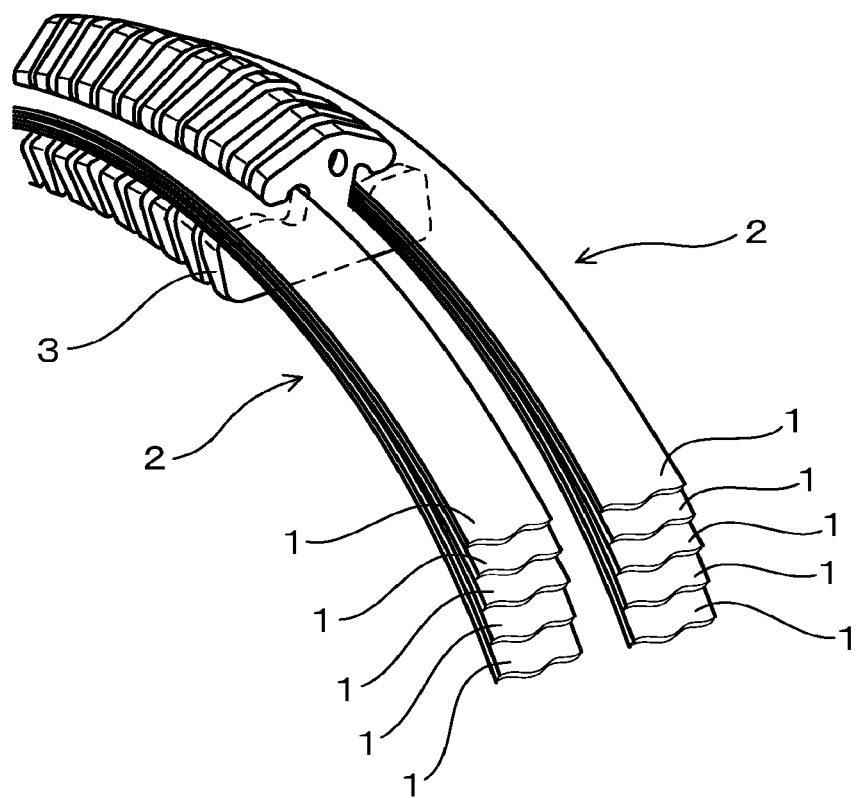

CVT RING MEMBER AND METHOD FOR MANUFACTURING THE SAME

TECHNICAL FIELD

The present invention relates to a ring member which constitutes a power transmission belt for use in CVT, namely, a CVT ring member, and a method for manufacturing the same.

BACKGROUND ART

Reduction in fuel consumption in automobiles is strongly demanded from the viewpoints of environmental problems and the like. With such demands in the background, recently in automobile transmission systems, a belt-type continuously variable transmission (hereinafter appropriately abbreviated as "CVT") is widely employed for its beneficial advantage in improvement of fuel consumption. The power transmission belt used in CVT is configured by piling a plurality of metallic thin ring member layers on each other to constitute one set of CVT belt and assembling a plurality of friction members called elements to two sets of the CVT belts.

The CVT belt does not directly contact with a pulley in CVT, but is rotated in a state assembled with the elements to constitute a power transmission belt to transmit power, and repeatedly undergoes tension or bending stress during the rotation. Therefore, materials having excellent fatigue strength must be used as the materials for the ring member which constitutes a CVT belt. Further, with improvement in output performance of automobiles in recent years, the power transmission belt has come to be required to have higher strength than ever before.

PRIOR ART DOCUMENT

Patent Document

Patent Literature 1: JP 4285303 B
Patent Literature 2: JP 2011-195861 A

SUMMARY OF THE INVENTION

Problem to be Solved by the Invention

Maraging steel, which is known as a high-strength material, has conventionally been applied to ring members. The maraging steel, however, contains expensive Ni, Co and Mo in large amounts, resulting disadvantageously in very high material cost. Therefore, in order to produce a high-strength material having excellent fatigue strength, a high-alloy steel has been employed, as described in Patent Literature 1 as one known art.

Patent Literature 2 discloses excellent steel produced at a far lower cost than maraging steel by reducing the contents of expensive alloy elements and also having fatigue strength characteristic equivalent to that of the maraging steel. However, when required to have remarkably higher strength characteristic than that of conventional steel, the steel of Patent Literature 2 cannot reach the required level in some cases. Therefore, the steel used in the CVT ring member still affords room for improvement at present.

In light of such background, the present invention aims at providing an inexpensive CVT ring member which ensures strength characteristic suitable for use as a CVT belt, and a method for manufacturing the same.

Means for Solving the Problem

One aspect of the present invention is a CVT ring member including a nitrided layer on a surface thereof, the ring member including a chemical composition which contains, by mass, C: 0.43 to 0.70%, Si: 2.50% or less, Mn: 1.00% or less, Cr: 1.50 to 4.00%, Mo: 0.50 to 3.00% and V: 1.00% or less, while satisfying a relation of Formula 1: $159 \times C(\%) + 91 \times Si(\%) + 68 \times Cr(\%) + 198 \times Mo(\%) + 646 \geq 1,000$, and the balance being Fe and unavoidable impurities;

the ring member having a tensile strength of 1,700 MPa or more; and the nitrided layer having a surface hardness of HV800 to HV950.

Another aspect of the present invention is a method for manufacturing a CVT ring member, including:

preparing an ingot which contains, by mass, C: 0.43 to 0.70%, Si: 2.50% or less, Mn: 1.00% or less, Cr: 1.50 to 4.00%, Mo: 0.50 to 3.00% and V: 1.00% or less, while satisfying a relation of Formula 1: $159 \times C(\%) + 91 \times Si(\%) + 68 \times Cr(\%) + 198 \times Mo(\%) + 646 \geq 1,000$, and the balance being Fe and unavoidable impurities;

plastically working the ingot to form a plate material;

bending the plate material and welding end faces of the plate material to form a crude ring material;

annealing the crude ring material, and thereafter cold-rolling the crude ring material to form a ring material having a desired thickness;

heating the ring material to a heating temperature $T_1$ ranging from 850° C. to 1,000° C. followed by quenching; and then nitriding the ring material at a treatment temperature $T_2$ ranging from 400° C. to 500° C.

Effects of the Invention

The above CVT ring member has a chemical composition as specified above and includes a nitrided layer on a surface thereof. The tensile strength and the surface hardness of the nitrided layer are adjusted within ranges as specified above. This enables the above CVT ring member to satisfy the requirement for high strength and lower cost since the amounts of expensive elements contained in the ring member is not so large in comparison with the maraging steel. The above manufacturing method enables production of such an excellent CVT ring member.

BRIEF DESCRIPTION OF THE DRAWINGS

FIG. 1 is an explanatory view illustrating the use state of a CVT ring member in Examples.

MODE FOR CARRYING OUT THE INVENTION

Firstly, the reasons for defining the ranges of the amounts of the chemical components in the above CVT ring member will be described.

C (Carbon): 0.43 to 0.70%;

C is an element which is necessary to increase strength, and must be contained in an amount of 0.43% or more in order to sufficiently provide the effect. Meanwhile, when C is excessively added, productivity is deteriorated, and further, a coarse carbide is formed, leading to reduction in strength. Therefore, the upper limit of the amount of C to be added is defined as 0.70%.

Si (Silicon): 2.50% or less;

Si is an element which is necessary to increase strength, and provides the effect even in a slight amount, but is preferably added in an amount of 0.10% or more. However, excessive addition of Si deteriorates productivity and becomes a factor to inhibit nitridability. Therefore, the upper limit of the amount of Si to be added is defined as 2.50%.

Mn (Manganese): 1.00% or less;

Mn is an element which is necessary to increase strength, and provides the effect even in a slight amount, but is preferably added in an amount of 0.10% or more. However, excessive addition of Mn leads to reduction in ductility. Therefore, the upper limit of the amount of Mn to be added is defined as 1.00%.

Cr (Chromium): 1.50 to 4.00%;

Cr is an element which is necessary to increase strength and to ensure nitridability, and must be added in an amount of 1.50% or more in order to sufficiently provide these effects. However, excessive addition of Cr causes formation of a coarse carbide and reduction in strength, and also leads to increase in cost. Therefore, the upper limit of the amount of Cr to be added is defined as 4.00%.

Mo (Molybdenum): 0.50 to 3.00%;

Mo is an element which is necessary to increase strength, and must be contained in an amount of 0.50% or more in order to sufficiently provide the effect. However, excessive addition of Mo leads to increase in cost. Therefore, the upper limit of the amount of Mo to be added is defined as 3.00%.

V (Vanadium): 1.00% or less (except 0%)

V is an element which is effective for increasing strength and for ensuring nitride properties. However, excessive addition of V leads to increase in cost. Therefore, the upper limit of the amount of V to be added is defined as 1.00%.

Formula 1: $159 \times C(\%) + 91 \times Si(\%) + 68 \times Cr(\%) + 198 \times Mo(\%) + 646 \geq 1{,}000$;

An excellent fatigue life can be ensured by satisfying the relation of the above chemical components in Formula 1. On the other hand, when the chemical components do not satisfy the relation of Formula 1, it is difficult to ensure sufficient fatigue strength characteristic.

Next, the tensile strength of the above CVT ring member is 1,700 MPa or more. The CVT ring member may undergo a high tensile load during use. In order to prevent the ring member from being broken under this high load, the ring member must have a tensile strength of 1,700 MPa or more. This mechanical property can be realized by application of the above manufacturing method.

The surface hardness of the nitrided layer of the above CVT ring member ranges from HV800 to HV950. When the surface hardness of the above nitrided layer is less than HV800, the ring member is likely to wear out upon contact with the elements. On the other hand, when the surface hardness of the above nitrided layer exceeds HV950, the material becomes brittle, leading to difficulty in ensuring the strength as a ring member. That is why the surface strength of the above nitrided layer is defined within the above range. Ensuring of this property can be realized by application of the above manufacturing method.

Next, the respective conditions in the method for manufacturing the above CVT ring member will be described.

The above manufacturing method involves, firstly, preparing an ingot having the above-specified chemical components and plastically working the ingot to form a plate material. For the plastic working, various known plastic working methods can be applied, including hot rolling, hot forging, cold rolling and cold forging. Typically, the ingot is subjected to hot working and thereafter cold working to produce a plate material. When a black skin (oxide film) generated on a surface of the plate material by hot working is preferably removed before cold working. The removal of the black skin can be carried out, for example, by mechanical working such as peeling or pickling.

Then, the resultant plate material as described above is bent and the end faces thereof are welded to each other to form a crude ring material. The bending can be carried out, for example, by a roll bending method after cutting of the above plate material into a predetermined size. The welding can be carried out, for example, by plasma welding or laser welding in a state where both end faces butt against one another. It is effective for rationalization of steps to preliminarily produce the above crude ring material with a wide width including the widths of a plurality of ring materials and to cut the crude ring material into a desired width before the subsequent step. In this case, the cut face is preferably deburred, for example, through barrel finishing after width cutting.

Next, the above crude ring material is annealed, and then cold-rolled to form a ring material having a desired plate thickness. Thereafter, the ring material is heated to a heating temperature $T_1$ ranging from 850° C. to 1,000° C. and then quenched, and, according to need, is tempered after the quenching.

The heating temperature $T_1$ for the quenching is defined as 850° C. or higher in order to form a solid solution of C and to ensure the internal hardness. However, since too high a heating temperature for the quenching causes coarsening of crystal grains and reduction in ductility, the upper limit of the heating temperature $T_1$ is defined as 1,000° C. Further, the heating temperature $T_1$ during the quenching preferably satisfies a relation of Formula 2: $0.015 \times C(\%) - 0.014 \times Cr(\%) + 1.46 \times V(\%) - 0.81 \times T_1/1{,}000 + 0.71 \geq 0.05$. In this case, V carbides (VCs) having a pinning effect can sufficiently be ensured, and the coarsening of crystal grains and the reduction in ductility can be expected to be suppressed. Especially, when the heating temperature $T_1$ satisfies the condition of Formula 2, it is easy to control the size of crystal grains to 15 µm or less. A method for measuring crystal grains will be described later.

After the quenching, tempering can be additionally carried out, according to need. Since the effect obtained by tempering is obtained also in the subsequent nitridation step, it is not necessary to carry out tempering as a separate step before the nitridation step. However, for example, when the period of time from the completion of quenching to the initiation of nitridation is very long, the quenching is preferably followed by tempering. The treatment temperature for tempering preferably ranges from 400° to 500° C. and is not higher than the nitridation temperature. This can suppress embrittlement of the material and ensure the tensile strength of the center portion in the cross section of the ring material at a predetermined value or more. When the tempering temperature is higher than 500° C., the internal hardness becomes low, resulting in reduction in tensile strength.

After the completion of the above quenching and optional tempering, the ring material is subjected to strain remedy in order to remove the strain caused by these treatments. This strain remedy can serve also as a treatment for adjusting the circumferential length of the ring material.

Thereafter, the above ring material is nitrided at a treatment temperature $T_2$ ranging from 400° C. to 500° C. This nitridation must be carried out at a treatment temperature $T_2$ of not lower than 400° C. in order to ensure the surface hardness of the ring material. However, too high a treatment temperature $T_2$ for nitridation causes excessive nitridation and excessive increase in the surface hardness so that the ring material would become brittle. Therefore, the upper limit of the treatment temperature $T_2$ is defined as 500° C.

For the nitridation, gas nitridation conducted in a nitrogen atmosphere or a nitrogen-containing gas mixture as well as nitrocarburization, salt bath nitridation, plasma nitridation and the like can be employed.

EXAMPLES

Example 1

Example of the above CVT ring member and a method for manufacturing the same will be described. In this Example, CVT ring members (Samples 1 to 32) made of plural kinds of steel materials were produced and evaluated in terms of a plurality of items, as indicated in Tables 1 and 2. A plurality of the CVT ring members 1 produced in this Example are piled to constitute a CVT belt 2, and two sets of the CVT belts 2 are assembled to a plurality of connecting elements 3 for use, as shown in FIG. 1.

Firstly, ingots having a chemical composition as indicated in Tables 1 and 2 were produced. Specifically, the raw materials for each of the samples were molten and cast by 30 kg VIM (Vacuum Induction Melting), thereby producing the ingots. The resultant ingots were subjected to extend forging as plastic working to produce plate materials having approximate dimensions: length 300 mm×width 155 mm×thickness 7 mm. Further, the resultant plate materials were subjected to mechanical working to remove a black skin therefrom, and thereafter cold-rolled, thereby producing plate materials having approximate dimensions: length 500 mm×width 200 mm×thickness 0.39 mm.

The resultant plate materials were cut into a length of about 300 mm and subjected to roll bending, and then the end faces in the longitudinal direction were plasma-welded to each other to form crude ring materials. Thereafter, the crude ring materials were cut into a width of about 5 to 15 mm. Then, the crude ring materials were subjected to barrel finishing to remove the burrs generated during cutting.

Next, the above crude ring materials were subjected to annealing involving holding the materials at 860° C. for 2 hours, and then subjected to cold-rolling to have a thickness of 0.2 mm, thereby producing ring materials. The resultant ring materials were heated and quenched. Further, some of the samples were optionally tempered. After heating the samples to a temperature as indicated in Tables 1 and 2 and holding for 60 minute, the quenching was carried out by air-cooling the samples. The condition for the tempering was that the samples were held at a tempering temperature of 425° C. for 1 hour.

Next, adjustment of the circumferential length of the above ring, serving also as strain remedy of the above ring materials was conducted. Specifically, the adjustment was conducted by bridging the above ring materials over the outer periphery of one pair of rollers (not shown) and rotating the ring materials while applying tension in a direction expanding an interval between the rollers.

Then, the above ring material was subjected to nitridation involving holding the ring materials at a nitridation temperature ranging from 350° to 550° C. in a gas mixture of $NH_3$ and $N_2$. The nitridation temperatures for the respective ring members were as indicated in Tables 1 and 2. The respective ring members (Samples 1 to 32) after nitridation were used to make evaluations as described below.

<Tensile Strength>

Tensile strength was measured by conducting a tensile test involving bridging the ring members over one pair of rollers and pulling the ring members via the one pair of rollers. The tensile strength was defined as a value obtained by measuring a stress change until the ring members are broken in the above tensile test and dividing the maximum stress by the cross sectional area of the ring members.

<Nitrided Layer Hardness>

The hardness of the nitrided layer was measured, at a surface of the ring members after nitridation, by micro-Vickers (available from SHIMADZU).

<Crystal Grain Size>

The crystal grain size was measured, at an arbitrary cross section of the ring members after nitridation, by a so-called "cutting method" using an optical microscope photograph. The cutting method is in conformity with ASTM, and involves drawing a straight line of a known length on a photograph of a metal structure and calculating the crystal grain size from the number of the grains intersecting this line. Specifically, a nitrided layer-free face obtained by etching an arbitrary cross section of the ring members with an aqueous hydrochloric acid-picric acid solution containing a surfactant is examined under an optical microscope to obtain a photograph with a magnification of 1,000×(times) in arbitrary 10 fields of view. Next, a straight line of an arbitrary length L (mm) is drawn on each of the photographs to obtain a number n of the crystal grains intersecting this straight line. The value of the length L (mm) of the straight line is converted into L' (μm) in consideration of the actual scale. Then L'/n (μm) is calculated, and the calculated value is defined as the crystal grain size. The average of 10 crystal grain size values obtained from 10 photographs was adopted as a final crystal grain size value.

<Fatigue Life>

Fatigue life was measured using a fatigue testing machine (not shown) which has a plurality of rollers over which the ring members are bridged, can apply predetermined tension to the ring members between the rollers, and can rotate the rollers to repeatedly apply bending stress to the ring members. Evaluation was made based on $10^6$ times, which is as an average repetition number for fatigue life when the current product maraging steel (Sample 19) was tested, as a reference number of times. The case where the result was not less than the reference number of times was ranked as "passed (○)," whereas the case where the result was less than the reference number of times was ranked as "failed (×)."

TABLE 1

| | Sample No. | Chemical Composition (by mass %) | | | | | | | | | | Value of Formula 1 (Note 1) | Heating Temperature $(T_1)$ ° C. |
| --- | --- | --- | --- | --- | --- | --- | --- | --- | --- | --- | --- | --- | --- |
| | | C | Si | Mn | Ni | Cr | Mo | V | Al | Ti | Co | | |
| Examples | 1 | 0.65 | 0.31 | 0.62 | — | 2.01 | 2.02 | 0.30 | — | — | — | 1314.20 | 950 |
| | 2 | 0.65 | 0.31 | 0.62 | — | 2.01 | 2.02 | 0.30 | — | — | — | 1314.20 | 950 |
| | 3 | 0.50 | 0.80 | 0.61 | — | 2.01 | 1.50 | 0.30 | — | — | — | 1231.98 | 875 |

TABLE 1-continued

| | | C | Si | Mn | Ni | Cr | Mo | V | Al | Ti | Co | Formula 1 | T₁ °C |
|---|---|---|---|---|---|---|---|---|---|---|---|---|---|
| | 4 | 0.50 | 0.80 | 0.61 | — | 2.01 | 1.50 | 0.30 | — | — | — | 1231.98 | 875 |
| | 5 | 0.45 | 2.48 | 0.59 | — | 3.11 | 0.50 | 0.30 | — | — | — | 1253.71 | 875 |
| | 6 | 0.45 | 2.48 | 0.59 | — | 3.11 | 0.50 | 0.30 | — | — | — | 1253.71 | 875 |
| | 7 | 0.56 | 0.79 | 0.98 | — | 2.02 | 2.01 | 0.29 | — | — | — | 1342.27 | 925 |
| | 8 | 0.56 | 0.79 | 0.98 | — | 2.02 | 2.01 | 0.29 | — | — | — | 1342.27 | 925 |
| | 9 | 0.68 | 0.60 | 0.61 | — | 2.03 | 2.51 | 0.98 | — | — | — | 1443.74 | 1000 |
| | 10 | 0.68 | 0.60 | 0.61 | — | 2.03 | 2.51 | 0.98 | — | — | — | 1443.74 | 1000 |
| | 11 | 0.45 | 0.80 | 0.31 | — | 3.98 | 2.01 | 0.11 | — | — | — | 1458.97 | 975 |
| | 12 | 0.45 | 0.80 | 0.31 | — | 3.98 | 2.01 | 0.11 | — | — | — | 1458.97 | 975 |
| | 13 | 0.46 | 0.82 | 0.61 | — | 2.01 | 2.00 | 0.30 | — | — | — | 1326.44 | 875 |
| | 14 | 0.46 | 0.82 | 0.61 | — | 2.01 | 2.00 | 0.30 | — | — | — | 1326.44 | 875 |
| | 15 | 0.55 | 1.01 | 0.82 | — | 2.01 | 2.98 | 0.31 | — | — | — | 1552.08 | 900 |
| | 16 | 0.55 | 1.01 | 0.82 | — | 2.01 | 2.98 | 0.31 | — | — | — | 1552.08 | 900 |
| | 17 | 0.43 | 0.79 | 0.60 | — | 3.11 | 1.00 | 0.30 | — | — | — | 1195.74 | 900 |
| | 18 | 0.43 | 0.79 | 0.60 | — | 3.11 | 1.00 | 0.30 | — | — | — | 1195.74 | 900 |

| Sample No. | | Tempering Temperature °C | Nitridation Temperature ($T_2$) °C | Value of Formula 2 (Note 2) | Evaluations | | | |
|---|---|---|---|---|---|---|---|---|
| | | | | | Tensile Strength MPa | Nitrided Layer Hardness HV | Fatigue Strength | Crystal Grain Size μm |
| Examples | 1 | 425 | 425 | 0.3601 | 1991 | 942 | ○ | 14.0 |
| | 2 | Not conducted | 425 | 0.3601 | 2005 | 931 | ○ | 14.2 |
| | 3 | 425 | 450 | 0.4186 | 1960 | 892 | ○ | 13.1 |
| | 4 | Not conducted | 450 | 0.4186 | 1972 | 888 | ○ | 12.8 |
| | 5 | 425 | 500 | 0.4025 | 1985 | 807 | ○ | 12.9 |
| | 6 | Not conducted | 500 | 0.4025 | 2001 | 821 | ○ | 13.0 |
| | 7 | 425 | 450 | 0.3643 | 2025 | 900 | ○ | 13.8 |
| | 8 | Not conducted | 450 | 0.3643 | 2049 | 891 | ○ | 13.6 |
| | 9 | 425 | 425 | 1.3126 | 2061 | 911 | ○ | 10.1 |
| | 10 | Not conducted | 425 | 1.3126 | 2068 | 919 | ○ | 9.8 |
| | 11 | 425 | 450 | 0.1129 | 1856 | 934 | ○ | 14.9 |
| | 12 | Not conducted | 450 | 0.1129 | 1871 | 944 | ○ | 14.7 |
| | 13 | 425 | 425 | 0.4180 | 1830 | 891 | ○ | 13.4 |
| | 14 | Not conducted | 425 | 0.4180 | 1846 | 901 | ○ | 13.1 |
| | 15 | 425 | 475 | 0.4137 | 1984 | 862 | ○ | 13.3 |
| | 16 | Not conducted | 475 | 0.4137 | 1999 | 881 | ○ | 13.5 |
| | 17 | 425 | 425 | 0.3819 | 1802 | 908 | ○ | 13.6 |
| | 18 | Not conducted | 425 | 0.3819 | 1821 | 922 | ○ | 13.8 |

(Note 1) Formula 1 = 159 × C(%) + 91 × Si(%) + 68 × Cr(%) + 198 × Mo(%) + 646
(Note 2) Formula 2 = 0.015 × C(%) − 0.014 × Cr(%) + 1.46 × V(%) − 0.81 × $T_1$/1000 + 0.71

TABLE 2

| Sample No. | | Chemical Composition (by mass %) | | | | | | | | | | Value of Formula 1 (Note 1) | Heating Temperature ($T_1$) °C |
|---|---|---|---|---|---|---|---|---|---|---|---|---|---|
| | | C | Si | Mn | Ni | Cr | Mo | V | Al | Ti | Co | | |
| Comparative Examples | 19 | 0.00 | 0.00 | 0.00 | 18.7 | 0.00 | 5.92 | 0.30 | 0.42 | 0.46 | 0.2 | 1639.96 | 875 |
| | 20 | 0.01 | 1.00 | 0.61 | — | 3.11 | 1.01 | 0.30 | — | — | — | 1213.65 | 875 |
| | 21 | 0.74 | 0.80 | 0.32 | — | 1.52 | 1.02 | 0.31 | — | — | — | 1141.78 | — |
| | 22 | 0.43 | 0.61 | 0.61 | — | 2.02 | 1.51 | 0.32 | — | — | — | 1396.17 | 850 |
| | 23 | 0.50 | 0.82 | 1.11 | — | 1.89 | 1.50 | 0.30 | — | — | — | 1232.44 | 900 |
| | 24 | 0.51 | 0.80 | 0.60 | — | 1.41 | 2.00 | 0.30 | — | — | — | 1291.77 | 900 |
| | 25 | 0.50 | 0.81 | 0.62 | — | 1.19 | 2.01 | 0.30 | — | — | — | 1492.11 | 1000 |
| | 25 | 0.65 | 0.81 | 0.60 | — | 3.10 | 0.41 | 0.30 | — | — | — | 1115.04 | 975 |
| | 27 | 0.49 | 0.82 | 0.61 | — | 2.01 | 2.00 | 0.30 | — | — | — | 1326.44 | 979 |
| | 25 | 0.49 | 0.82 | 0.61 | — | 2.01 | 2.00 | 0.30 | — | — | — | 1326.44 | 1100 |
| | 29 | 0.45 | 0.82 | 0.61 | — | 2.01 | 2.00 | 0.30 | — | — | — | 1326.44 | 900 |
| | 30 | 0.45 | 0.92 | 0.61 | — | 2.01 | 2.00 | 0.30 | — | — | — | 1326.44 | 900 |
| | 31 | 0.60 | 0.30 | 0.60 | — | 1.50 | 0.50 | 0.30 | — | — | — | 982.70 | 850 |
| | 32 | 0.45 | 0.30 | 0.60 | — | 3.12 | 1.00 | 0.11 | — | — | — | 1156.60 | 975 |

| Sample No. | | Tempering Temperature °C | Nitridation Temperature ($T_2$) °C | Value of Formula 2 (Note 2) | Evaluations | | | |
|---|---|---|---|---|---|---|---|---|
| | | | | | Tensile Strength MPa | Nitrided Layer Hardness HV | Fatigue Strength | Crystal Grain Size μm |
| Comparative Examples | 19 | Not conducted | 400 | 0.4393 | 1501 | 871 | ○ | 12.5 |
| | 20 | 425 | 425 | 0.4019 | 1681 | 871 | X | 13.4 |

TABLE 2-continued

| | | | | | | | |
|---|---|---|---|---|---|---|---|
| 21 | 425 | — | 0.3424 | — | — | — | 14.5 |
| 22 | 425 | 500 | 0.4576 | 1930 | 791 | ○ | 12.9 |
| 23 | 425 | 450 | 0.3386 | 2021 | 901 | X | 13.1 |
| 24 | 425 | 500 | 0.4069 | 1936 | 772 | ○ | 13.2 |
| 25 | 425 | 450 | 0.2368 | 2102 | 895 | X | 14.8 |
| 25 | 425 | 425 | 0.3246 | 1571 | 921 | ○ | 14.3 |
| 27 | 425 | 450 | 0.4585 | 1625 | 895 | ○ | 12.7 |
| 25 | 425 | 450 | 0.2358 | 2093 | 905 | X | 21.2 |
| 29 | 425 | 350 | 0.3378 | 2105 | 771 | ○ | 13.6 |
| 30 | 425 | 550 | 0.3378 | 1842 | 981 | X | 13.5 |
| 31 | 425 | 500 | 0.4475 | 1810 | 861 | X | 12.9 |
| 32 | 425 | 500 | 0.9431 | 1810 | 861 | X | 24.6 |

(Note 1) Formula 1 = 159 × C(%) + 91 × Si(%) + 68 × Cr(%) + 198 × Mo(%) + 646
(Note 2) Formula 2 = 0.015 × C(%) − 0.014 × Cr(%) + 1.46 × V(%) − 0.81 × $T_1$/1000 + 0.71

As is known from Tables 1 and 2, Samples 1 to 18 presented the results of higher tensile strength (internal hardness) and equal or higher nitrided layer hardness (surface hardness) as well as equal or higher fatigue characteristic to/than those of the maraging steel (Sample 19).

Samples 20 had too low a C content, resulting in inferior tensile strength and fatigue characteristic.

Sample 21 had too high a C content and became excessively hard, and thus could not be plastically worked into a ring shape. Therefore, measurement was impossible.

Sample 22 had too high an Si content and deteriorated nitridability so that N was difficult to infiltrate. Therefore, this sample presented the result of low nitrided layer hardness.

Sample 23 had too high an Mn content and deteriorated toughness, resulting in inferior fatigue characteristic.

Sample 24 had too low a Cr content and deteriorated nitridability, resulting in low nitrided layer hardness.

Sample 25 had too high a Cr content, contained a huge carbide formed therein, and was eventually broken at an early stage in the fatigue life test.

Sample 26 had too low an Mo content, resulting in low tensile strength.

Sample 27 insufficiently formed at solid solution of C because of too low a heating temperature in quenching during manufacture, resulting in low tensile strength.

Sample 28 contained former austenite crystal grains coarsened therein because of too high a heating temperature in quenching during manufacture and had deteriorated toughness, resulting in inferior fatigue characteristic.

Sample 29 presented the result of low nitrided layer hardness because of too low a nitridation temperature during manufacture.

Sample 30 had too high nitrided layer hardness because of too high a nitridation temperature during manufacture, and caused deterioration in toughness resulting in poor fatigue strength.

Sample 31 contained a chemical component which failed to satisfy Formula 1, resulting in inferior fatigue characteristic.

Sample 32 failed to satisfy Formula 2, and thus contained crystal grains coarsened therein, resulting in deterioration in toughness (ductility).

The invention claimed is:

1. A CVT ring member comprising:
a ring material; and
a nitrided layer on a surface of the ring material;
the ring material in contact with the nitrided layer having a chemical composition consisting of by mass:
C: 0.43 to 0.70%, Si: 0.10 to 2.50%, Mn: 0.10 to 1.00%, Cr: 2.01 to 4.00%, Mo: 0.50 to 3.00% and V greater than 0 and up to 1.00%, and the balance being Fe and unavoidable impurities by mass;
wherein the chemical composition satisfies a relation of Formula 1:
159×C (%)+91×Si (%)+68×Cr (%)+198×Mo (%)+646≥1195.74;
and the ring material has a crystal grain size of 15 μm or less;
wherein
the ring member has a tensile strength of 1,700 MPa or more;
the nitrided layer has a surface hardness of from HV800 to HV950; and
the ring member has a fatigue strength equal to or greater than the fatigue strength of a maraging steel having a nitride layer and the composition on a mass basis of 18.7% Ni, 5.02% Mo, 0.30% V, 0.12% Al, 0.45% Ti and 9.2% Co.

2. A CVT ring member comprising:
a ring material; and
a nitrided layer on a surface of the ring material;
the ring material in contact with the nitrided layer having a chemical composition consisting of by mass:
C: 0.43 to 0.70%, Si: 0.10 to 2.50%, Mn: 0.10 to 1.00%, Cr: 2.01 to 4.00%, Mo: 0.50 to 3.00% and V greater than 0 and up to 1.00%, and the balance being Fe and unavoidable impurities by mass;
wherein the chemical composition satisfies a relation of Formula 1:
159×C (%)+91×Si (%)+68×Cr (%)+198×Mo (%)+646≥1195.74;
wherein the ring material has a crystal grain size of from 9.8 to 14.9 μm;
wherein
the ring member has a tensile strength of 1,700 MPa or more;
the nitrided layer has a surface hardness of from HV800 to HV950; and
the ring member has a fatigue strength equal to or greater than the fatigue strength of a maraging steel having a nitride layer and the composition on a mass basis of 18.7% Ni, 5.02% Mo, 0.30% V, 0.12% Al, 0.45% Ti and 9.2% Co.

* * * * *